United States Patent [19]

Tomalia et al.

[11] 3,888,847
[45] June 10, 1975

[54] AZIRIDINYL HALOFORMIMIDES

[75] Inventors: Donald A. Tomalia; Thomas J. Giacobbe, both of Midland, Mich.

[73] Assignee: The Dow Chemical Company, Midland, Mich.

[22] Filed: May 11, 1973

[21] Appl. No.: 359,562

Related U.S. Application Data

[62] Division of Ser. No. 76,649, Sept. 29, 1970, Pat. No. 3,754,032.

[52] U.S. Cl. .............................................. 260/239 E
[51] Int. Cl. .......................................... C07d 23/06
[58] Field of Search ................................ 260/239 E

[56] References Cited
UNITED STATES PATENTS

| | | | |
|---|---|---|---|
| 3,220,848 | 11/1965 | Himmelmann et al. | 260/239 E |
| 3,324,112 | 6/1967 | Ottmann et al. | 260/239 E |

FOREIGN PATENTS OR APPLICATIONS

| | | | |
|---|---|---|---|
| 978,089 | 12/1964 | United Kingdom | 260/239 E |

*Primary Examiner*—Alton D. Rollins
*Attorney, Agent, or Firm*—L. Wayne White

[57] ABSTRACT

Novel carbodiimides of the formula

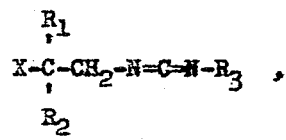

wherein X is chloro or bromo; $R_1$ and $R_2$ are hydrogen or lower alkyl; and $R_3$ is a hydrocarbyl or a halo- or nitro-substituted hydrocarbyl radical, are disclosed. The carbodiimides are prepared by reacting (a) an aziridine of the formula

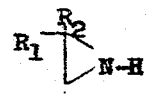

with (b) an isocyanide dihalide of the formula $R_3-N=CX_2$. Novel 1-aziridinecarboximidoyl halides of the formula

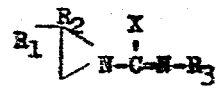

are prepared as intermediates in the process when the process is conducted in the presence of an acid acceptor, e.g. triethylamine. Such intermediates rearrange upon warming, or in the presence of an acid, to form the corresponding carbodiimide.

8 Claims, No Drawings

AZIRIDINYL HALOFORMIMIDES

CROSS-REFERENCE TO RELATED APPLICATION

This is a division of application Ser. No. 76,649, filed Sept. 29, 1970, now issued as U.S. Pat. No. 3,754,032.

BACKGROUND OF THE INVENTION

Previous methods of preparing carbodiimides are summarized in Chemical Reviews, 67, 107–52 by F. Kurzer et al. The reference also contains a general summary of the known carbodiimides and their general utilities.

SUMMARY OF THE INVENTION

It has now been discovered that novel asymmetric, 2-chloroalkyl carbodiimides of the general formula

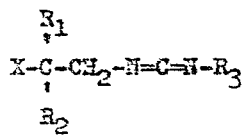

wherein X is chloro or bromo; $R_1$ and $R_2$ are hydrogen or lower alkyl; and $R_3$ is alkyl, cycloalkyl, aryl, alkaryl, aralkyl or halo- or nitro-substituted aryl, are conveniently prepared in the novel reaction comprising reacting by contacting (a) an aziridine of the formula

$R_1$ and $R_2$ having the above meaning, with (b) an isocyanide dihalide of the formula $R_3$—N═$CX_2$, X and $R_3$ having the above meaning. The subject carbodiimides are useful, for example, as monomers, polymerization promoters and as stabilizers for polymers which are subject to degradation due to heat, light and/or hydrolysis.

The novel process is represented by equations (I) and/or (II).

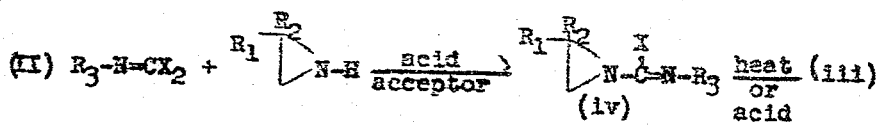

The direct process represented by (I) is generally an exothermic reaction. The product yields from (I) may be lowered due to formation of polymeric by-products. The indirect process, (II), proceeds smoothly in the presence of an acid acceptor, e.g. triethylamine or pyridine, to form an intermediate, (iv), and a hydrohalide salt. The intermediate, (iv), is then easily isomerized to form the desired product by merely (a) warming same to a temperature sufficient to cause ring opening of the

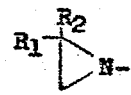

group, preferably in the presence of an inert solvent, or (b) forming an admixture of (iv) and a catalytic amount of an acid (e.g., HCl, $H_2SO_4$, $HClO_4$, $H_3PO_4$, $CF_3COOH$, $SO_2$, $AlCl_3$, $FeCl_3$, etc.), preferably in the presence of an inert solvent.

Isocyanide dihalides, as represented by (i) above, are a known class of compounds. Any compound within this class will be suitable for use in the subject process. Representative of such compounds include those in (i) wherein X is chloro and $R_3$ is methyl, ethyl, butyl, cyclohexyl, octyl, dodecyl, octadecyl, phenyl, naphthyl, o-, m-, or p-tolyl, 3,5-dimethylphenyl, 4-t-butylphenyl, 4-octylphenyl, benzyl, phenethyl, β-naphthylethyl, 4-phenylbutyl, 4-aminophenyl, 3-aminophenyl, 2-fluorophenyl, 4-chlorophenyl, 2,4-dichlorophenyl, 4-iodophenyl, and the like, and the corresponding compounds wherein X is bromo. The preferred isocyanide dihalide reactants are those in (i) wherein X is chloro, and most preferred are those wherein X is chloro and $R_3$ is aryl or halo- or nitro-substituted aryl.

Suitable aziridine reactants, (ii), include aziridine (ethylenimine), 2-methylaziridine, 2,2-dimethylaziridine, 2-ethylaziridine, 2-butylaziridine, and the like. Preferably, (ii) is aziridine, 2-methylaziridine or 2,2-dimethylaziridine, and most preferably, (ii) is aziridine.

The reaction temperature is generally selected between about −20° and 50°C. If the indirect process is followed, the temperature is preferably maintained between about −20° and 5°C. until (iv) is formed. At temperatures above about 50°C., the product yield in some instances is lowered due to the formation of polymeric by-products.

The stoichiometry of the reaction requires 1 mole of (i) per mole of (ii). However, an excess of either (i) or (ii) may be used, e.g. from 1 to 3 times the stoichiometric amount, or more. In the indirect process, at least 1 mole of acid acceptor is preferably included per mole of HX generated; if less than 1 mole of acid acceptor per mole of HX is used, the product yield of (iv) may be lowered due to formation of (iii) and/or polymeric by-products.

Pressure on the reaction is not critical. Atmospheric pressure is convenient and generally used.

The process, whether via equation (I) or (II), is preferably conducted in an inert solvent, such as carbon tetrachloride, methyl chloroform, chloroform, bromoform, benzene, toluene, hexane, etc. Carbon tetrachloride is preferred in most instances.

The subject carbodiimides, (iii), are generally liquids which may be used in substantially the same manner as were other carbodiimides (see Kurzer et al. above) to achieve similar results. Additionally, the subject carbodiimides can be homopolymerized to give unique polymers bearing reactive chloroalkyl groups which are themselves useful, as chelating agents, for example, or which can be further reacted with ammonia or other amines to give quaternary ammonium-bearing polymers which are useful, for example, as ion exchange resins. Additionally, the subject carbodiimides may be copolymerized with other known carbodiimides to form polymers which are similarly useful. Such polymerization reactions occur upon heating the monomer(s) or by warming the monomer(s) in the presence of a suitable catalyst. See, for example, U.S. Pat. No. 3,200,087 which describes certain carbodiimide polymers and polymerization catalysts which may be used herein.

SPECIFIC EMBODIMENTS

The following examples further illustrate the invention.

EXAMPLE 1

Preparation of N-(2-chloroethyl)-N'-m-nitrophenylcarbodiimide

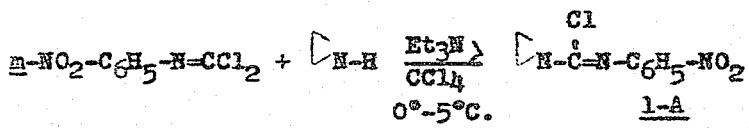

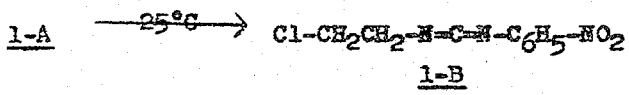

A solution of aziridine (0.1 mole) and triethylamine (0.1 mole) in 75 ml. of carbon tetrachloride was added dropwise to a stirred, pre-cooled solution of m-nitrophenyl isocyanide dichloride (0.1 mole) in 75 ml. of carbon tetrachloride over a period of 1.5 hours; the temperature was maintained between 0° and 5°C. during this time. The reaction mixture was warmed to room temperature and maintained at room temperature for 0.5 hour with continued stirring. Triethylamine hydrochloride was removed from the reaction mixture by filtration and the solvent and other volatiles were removed from the filtrate under reduced pressure. Compound 1–A was thus obtained as a crystalline solid which, after recrystallization from diethyl ether, had a melting point of 68°–70°C. The compound was stable at −5° to 0°C. for several months. Elemental analysis showed:

|  |  | Theory | Found |
|---|---|---|---|
| $C_9H_8ClN_3O_2$ | % C | 48.0 | 48.3 |
|  | % H | 3.55 | 3.57 |
|  | % N | 18.7 | 18.5 |

A sample (0.3 g.) of 1–A was warmed in a vessel equipped with a condenser and drying tube at a temperature of 68°C. for 12 minutes. The resulting yellow liquid, 1–B, was produced in quantitative yield from 1–A and in from 88–100 percent yield in a series of runs, based on starting materials. Elemental analysis showed:

|  |  | Theory | Found |
|---|---|---|---|
| $C_9H_8ClN_3O_2$ | % C | 48.0 | 48.5 |
|  | % H | 3.55 | 3.58 |

In a subsequent experiment, a sample of 1–A was dissolved in acetone containing a catalytic amount of hydrochloric or perchloric acid. The conversion of 1–A to 1–B proceeded smoothly to completion in 1 hour at room temperature.

EXAMPLES 2–6

In like manner, the following carbodiimides were prepared in accordance with the equation

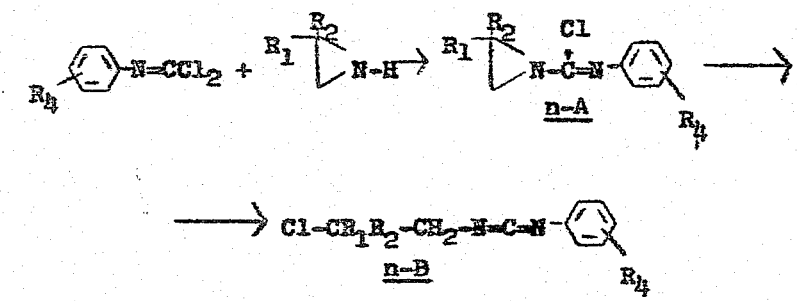

Table 3

| Example, n | $R_1$ | $R_2$ | $R_4$ | Product Description n–A |
|---|---|---|---|---|
| 2 | H | H | H | light yellow liquid |
| 3 | H | H | 4-Cl | crystalline solid; m.p 23–25°C. |
| 4 | $CH_3$ | H | H | light yellow liquid |
| 5 | $CH_3$ | H | 3-$NO_2$ | amorphous solid |
| 6 | $CH_3$ | $CH_3$ | 3-$HO_2$ | white crystals; m.p 26–28°C. |

The products, n–B, were typically obtained by warming a solution of n–A in $CCl_4$ at 40°C. until the isomerization was complete, e.g. 14 hours and 31 hours for Examples 2 and 3, respectively. Alternatively, n–B was formed by stirring n–A in an acetone/hydrochloric or perchloric acid solution for 1 hour at room temperature. In both procedures, the product, n–B, was formed in essentially quantitative yield, based on n-A, and in 80–100 percent yield, based on starting materials.

In some instances, n-B was formed by merely warming n-A neat, e.g. Examples 2 and 6. Pursuant to this procedure, however, Example 6-A yielded a mixture of 6-B and

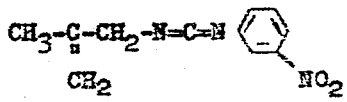

What is claimed is:

1. A compound of the formula

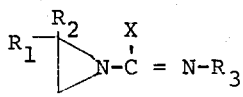

wherein X is chloro or bromo, $R_1$ and $R_2$ are H or lower alkyl and $R_3$ is alkyl of from one to 18 carbon atoms, cyclohexyl, phenyl, naphthyl, alkyl-substituted phenyl wherein the alkyl group has from one to eight carbon atoms, phenalkyl wherein the alkyl group has one to four carbon atoms, β-naphthylethyl, mono- or dihalosubstituted phenyl or mononitrosubstituted phenyl.

2. The compound of claim 1 wherein $R_1$ and $R_2$ are H or $CH_3$.

3. The compound of claim 1 wherein X is chloro.

4. The compound of claim 1 wherein $R_3$ is phenyl, naphthyl, mono- or dihalosubstituted phenyl or mononitrosubstituted phenyl.

5. The compound of claim 4 wherein $R_3$ is phenyl or naphthyl.

6. The compound of claim 5 wherein $R_3$ is phenyl.

7. The compound of claim 1 wherein $R_1$ and $R_2$ are H, X is chloro and $R_3$ is phenyl.

8. A process for producing the compound defined in claim 1 comprising reacting by contacting, in the presence of an acid acceptor, (a) an aziridine of the formula

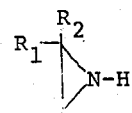

with (b) an isocyanide dihalide of the formula $R_3-N = CX_2$, said process being conducted at a temperature of from about $-20°$ to about $5°C$.

* * * * *